United States Patent
Stehly

(10) Patent No.: US 10,662,667 B2
(45) Date of Patent: May 26, 2020

(54) FOLDING SHELTER STRUCTURE DEVICE

(71) Applicant: VITABRI, Bensancon (FR)

(72) Inventor: Alain Stehly, Charnay (FR)

(73) Assignee: VITABRI, Besancon (FR)

( * ) Notice: Subject to any disclaimer, the term of this patent is extended or adjusted under 35 U.S.C. 154(b) by 0 days.

(21) Appl. No.: 15/776,665

(22) PCT Filed: Nov. 16, 2016

(86) PCT No.: PCT/FR2016/052965
§ 371 (c)(1),
(2) Date: May 16, 2018

(87) PCT Pub. No.: WO2017/085398
PCT Pub. Date: May 26, 2017

(65) Prior Publication Data
US 2018/0328073 A1  Nov. 15, 2018

(30) Foreign Application Priority Data

Nov. 16, 2015  (FR) .................................... 15 61007
May 12, 2016  (FR) .................................... 16 54227

(51) Int. Cl.
*E04H 15/50* (2006.01)
*E04H 15/46* (2006.01)

(52) U.S. Cl.
CPC ............. *E04H 15/50* (2013.01); *E04H 15/46* (2013.01)

(58) Field of Classification Search
CPC .......... E04H 15/50; E04H 15/46; E04H 15/52
See application file for complete search history.

(56) References Cited

U.S. PATENT DOCUMENTS

| 4,607,656 A * | 8/1986 | Carter ..................... E04H 15/50 135/122 |
| 5,085,398 A * | 2/1992 | Holcomb ................ E04G 17/18 249/211 |
| 6,141,934 A * | 11/2000 | Zeigler .................... E04H 15/50 135/121 |
| 6,206,020 B1 * | 3/2001 | Lynch ..................... E04H 15/50 135/128 |
| 7,533,498 B2 * | 5/2009 | Zeigler ................. E04B 1/3205 135/128 |

(Continued)

FOREIGN PATENT DOCUMENTS

| DE | 20320097 U1 | 3/2004 | |
| DE | 102004053669 A1 * | 5/2006 | ............. E04H 15/46 |

(Continued)

OTHER PUBLICATIONS

English translation of DE 102004053669 A1 from espacenet.com.*

*Primary Examiner* — David R Dunn
*Assistant Examiner* — Danielle Jackson
(74) *Attorney, Agent, or Firm* — Craft Chu PLLC; Andrew W. Chu

(57) ABSTRACT

The folding shelter structure device includes posts supporting at the upper portion thereof a deformable frame having movable side members. Each side member has at least one pair of scissor-hinge arms connected to the posts via pivot points. At least one arm of a pair of arms of a side member is provided to be longitudinally adjustable via a mechanism for elongating and shortening the length thereof.

10 Claims, 3 Drawing Sheets

(56) References Cited

U.S. PATENT DOCUMENTS

| | | | | |
|---|---|---|---|---|
| 7,637,275 B2 * | 12/2009 | Stehly | ................ | E04H 15/50 |
| | | | | 135/114 |
| 7,703,469 B2 * | 4/2010 | Danziger | ................ | E04H 15/50 |
| | | | | 135/120.3 |
| 2010/0101617 A1 * | 4/2010 | Stehly | ................ | E04H 15/46 |
| | | | | 135/96 |
| 2012/0006373 A1 * | 1/2012 | Stehly | ................ | E04H 15/50 |
| | | | | 135/140 |

FOREIGN PATENT DOCUMENTS

| | | | | |
|---|---|---|---|---|
| JP | S53133409 U | 10/1978 | | |
| WO | WO-9111979 A1 * | 8/1991 | ............ | A61G 7/005 |
| WO | 2005079414 A2 | 9/2005 | | |
| WO | 2007057604 A1 | 5/2007 | | |
| WO | WO-2013125856 A1 * | 8/2013 | ............ | E04H 15/50 |

* cited by examiner

FOLDING SHELTER STRUCTURE DEVICE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of deployable structure devices intended to be used as a shelter or tent.

2. Description of Related Art Including Information Disclosed Under 37 CFR 1.97 and 37 CFR 1.98

Such a shelter is generally made up of a metal structure covered at least in an upper part by a cover element forming a roof, such as a tarp. Said structure is provided to be deployable, allowing the shelter to go from a folded position, for storage and transport, to a deployed position forming a shelter, and vice versa. In the deployed position, the shelter is globally polyhedron-shaped, preferably a parallelepiped rectangle topped by the cover element.

Further, known, in particular from documents DE-20320097-U and WO 2007/057604, is a shelter structure comprising several telescoping uprights, each including several segments mounted sliding longitudinally, vertically, relative to one another. These uprights support, at their upper segment, a skeleton forming a mesh and made up, in the longitudinal direction, of several stringers connected to one another movably, on the one hand, over their length, in particular their center, through scissor-type articulations, and on the other hand, at their ends through pivoting articulations, giving the assembly a global pantograph shape, able to fold and unfold like an accordion. The ends of some stringers are connected to the upper segments of the uprights through pivot points. Furthermore, some pivot points of the ends of the stringers slide along upper segments of the corresponding uprights.

Transversely, the skeleton has a similar framework, in journal crosses, connecting cross-pieces, with a similar deformable geometry.

Thus, the skeleton has a specific shape, with inner boxes, configured in deformable polyhedrons, in particular parallelograms, particularly with diamond-shaped and triangular faces. This skeleton has at least a symmetry along a vertical axis orthogonal to the longitudinal direction of the structure, then allowing the passage from the folded position, where the uprights are close to one another, to the deployed position of the shelter, and vice versa, by deformation of said boxes.

While it is common to equip these shelters with a pointed roof, with a frustoconical shape, in some cases, a roof with a single slope is preferred, in particular a slope decreasing from front to back.

However, such single-slope shelters remain limited in number, in particular due to their restricted use and the impossibility of folding them optimally. Indeed, such shelters have an asymmetrical structure, raised in the front. This raising causes an incline of the skeleton and its asymmetry making folding of the shelter impossible or very complex, through tedious manipulations, to obtain a structure folded within a volume larger than that of a traditional shelter. Single-slope shelters are then often made up of a removable and non-bendable structure. Furthermore, the slope of the roof of such a shelter is determined based on the length of the stringers, making it impossible to alter its degree of incline.

BRIEF SUMMARY OF THE INVENTION

The invention specifically targets a shelter whose cover element has a single slope, extending in a decreasing manner, from the front to the back of the shelter or vice versa, or even from one side to the other. Such a shelter has a skeleton configured in a pantograph.

In this context, the invention aims to propose a shelter making it possible, from a structure with a skeleton configured in a pantograph allowing the deployment and folding of the shelter, to obtain an incline of the slope of the cover element.

Furthermore, the degree of this slope may be modified based on the installation, or even weather conditions.

To that end, it has been considered to provide at least one stringer having an adjustable length, preferably at least two, from a lengthened position toward a shortened position, and vice versa, through intermediate positions. Preferably, the longitudinally adjustable aspect of each stringer is provided in a telescoping manner, by sliding of segments making up the stringers and the adapted means with which they are equipped.

Then, by extending or shortening the length, having become adjustable, of each stringer, one deforms the geometry of the entire structure, inclining each upright to which it is connected. Due to the telescoping nature of each upright, it is then possible to increase or decrease its height and thus to correct its incline relative to the vertical, in order to straighten the entire structure and raise one of its sides, providing the desired single slope to the roof. By operating in the opposite manner, it is possible to return to a traditional structure shape, authorizing the confined folding within a same space as a traditional structure.

Thus, the invention relates to a deployable shelter structure device, comprising uprights supporting the upper part of a deformable skeleton comprising moving stringers made up of at least one pair of articulated scissor arms and connected through pivot points to uprights.

Such a device is characterized by the fact that at least one arm of the pair of arms of the stringers is provided longitudinally adjustable through means for extending and shortening its length.

Preferably, at least one arm is longitudinally adjustable at a first end of a stringer and at least one arm, which depending on the case may or may not belong to the same pair, at the opposite end of this stringer is also longitudinally adjustable through lengthening and shortening means.

According to additional features, said lengthening and shortening means may be telescoping, through sliding segments making up each adjustable arm.

Said lengthening and shortening means may comprise indexing means for the length of each adjustable arm at extreme lengthened and shortened positions, or even in intermediate positions.

Thus, by lengthening or shortening the adjustable arms between several extreme, or even intermediate, positions, it is possible to adjust the degree of incline of the slope obtained at the roof.

According to the preferred embodiment, the means for lengthening and shortening each adjustable arm may comprise a sheath, on the one hand, mounted outwardly sliding relative to a main segment of said adjustable arm and, on the other hand, secured to a pivot point (or an articulation point) at an upright.

Said sheath may be secured to the pivot point through a distal segment fastened to one end of said sheath and mounted rotating through said pivot point (or a rotation point).

Said indexing means may be mounted fixed on said sheath and may comprise a lug cooperating by insertion through orifices arranged across from one another and along said main segment.

Furthermore, at least two uprights may be provided telescoping, making it possible to adjust their length and straighten the structure.

BRIEF DESCRIPTION OF THE SEVERAL VIEWS OF THE DRAWINGS

Other features and advantages of the invention will emerge from the following detailed description of embodiments of the invention, in reference to the appended figures.

DETAILED DESCRIPTION OF THE INVENTION

Figure 1:
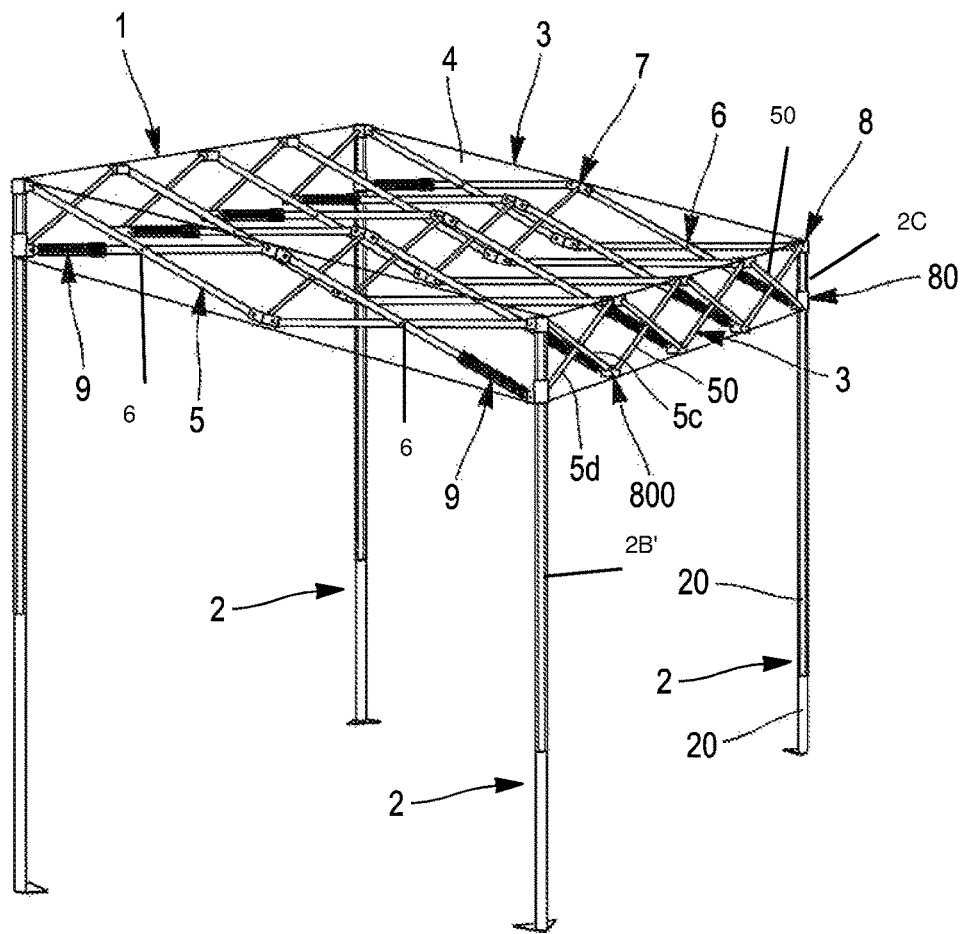
FIG. 1 schematically shows a perspective view of one preferred, non-limiting embodiment of a structure device according to the invention, showing a raising of the front uprights, located on the left, imparting a slope decreasing from left to right in the figure.

The present invention relates to a structure device 1 intended to be used as a shelter or tent.

Said structure 1 comprises uprights 2 (a first upright 2A with a first upper part 2A' and a second upright 2B with a second upper part 2B') supporting the skeleton 3. The structure 1 is intended to receive, by covering, a cover element 4, then forming the roof. The shelter thus covered then has a global polyhedron shape.

According to the preferred embodiment shown in FIG. 1, the shelter is rectangular and has four uprights 2.

According to other embodiments, not shown, the shelter may have another shape, in particular with a hexagonal or octagonal base, then including a larger number of uprights 2.

Said device 1 is provided to be deployable, able to go from a folded position to a deployed position, and vice versa. To that end, the skeleton 3 is provided to be deformable. In particular, it is made up of elements articulated to one another, allowing a deformation of the geometry of the entire structure 1, in order to go from a folded position to a deployed position, through intermediate positions, and vice versa.

To that end, longitudinally, said skeleton 3 comprises moving stringers 5. Furthermore, transversely, the skeleton 3 may comprise crosspieces 50 also provided to be movable, articulated similarly to the stringers 5, to form a transverse framework of journal crosses.

More particularly, a stringer 5 is made up of at least one pair of arms 5, articulated in a scissor. Each moving stringer comprises a first pair 5' of articulated scissor arms, and a second pair 5" of articulated scissor arms. The first pair 5' of articulated scissor arms is comprised of a first primary arm 5a' and a first secondary arm 5b'. The second pair 5" of articulated scissor arms is comprised of a second primary arm 5a", and a second secondary arm 5b". The second primary arm 5a" has a first set length, and the second secondary arm 5b" having a second set length. Thus, these arms 5a, 5b 5a', 5a", 5b', 5b" are connected, substantially at their middle, through an articulation 6 or first middle pivot point 6A or second middle pivot point 6B with a horizontal or substantially horizontal rotation axis.

To that end, on the one hand, the mobility of the stringers 5 is obtained through scissor articulations 6 of its pair(s) of arms.

As illustrated in the figures, a stringer 5 may be made up of a series of such pairs of arms articulated in a scissor. At least one end of each arm of a first pair is connected to the matching end of an arm of the following pair, via pivoting articulations 7, in particular in the form of a connecting rod 70. The first primary arm 5a' is connected to the first upper part of the first upright at a first primary upper pivot point 80A and to the first secondary arm at a first pivoting articulation 7'. The first secondary arm 5b' is connected to the second upper part of the second upright at a second primary upper pivot point 80B and to the first primary arm at the first pivoting articulation 7'. The second primary arm 5a" is connected to the first upper part of the first upright at a first secondary upper pivot point 8A and to the second secondary arm at a second pivoting articulation 7. The second secondary arm 5b" is connected to the second upper part of the second upright at a second secondary upper pivot point 8B and to the second primary arm at the second pivoting articulation 7

Furthermore, the mobility of the stringers 5 is obtained at least with the uprights 2 through pivot points 8; 80 with the arms. This junction is done at opposite ends of the stringers 5. In particular, the pivot point 8, located at the upper end of the upright 2 and connecting the latter to the end of the arm, depending on the case, is stationary. At the same time, another lower pivot point 80 is located lower and is mounted sliding along said upright 2. This lower pivot point 80 is consequently slidingly connected to this upright 2 at the end of the arm, depending on the case. The first primary arm 5a' is pivotally connected to the second primary arm 5a" at a first middle pivot point 6A between the first primary upper pivot point 80A and said first pivoting articulation 7'. The first secondary arm 5b' is pivotally connected to the second secondary arm 5b" at a second middle pivot point 6B between the second primary upper pivot point 80B and the first pivoting articulation 7'. The first secondary upper pivot point 8A is placed above the first primary upper pivot point 80A. The second secondary upper pivot point 8B is placed above the second primary upper pivot point 80B.

Thus, during the folding and deployment phases, at the ends of the stringers 5, the arms 5a', 5b' are connected through lower pivot points 80A, 80B, on these uprights 2A 2B and slide vertically, according to the first set length and the second set length ensuring the deformation of the skeleton 3 for good folding of the assembly.

It will be noted that the sliding translation may in particular be done via a carriage on which the lower pivot point 80 is mounted, said carriage sliding within a rail, in particular made up of a guideway arranged within said upright 2. This carriage can be locked relative to the upright 2 in several positions, in particular in a high position when the structure is deployed.

Figure 2:
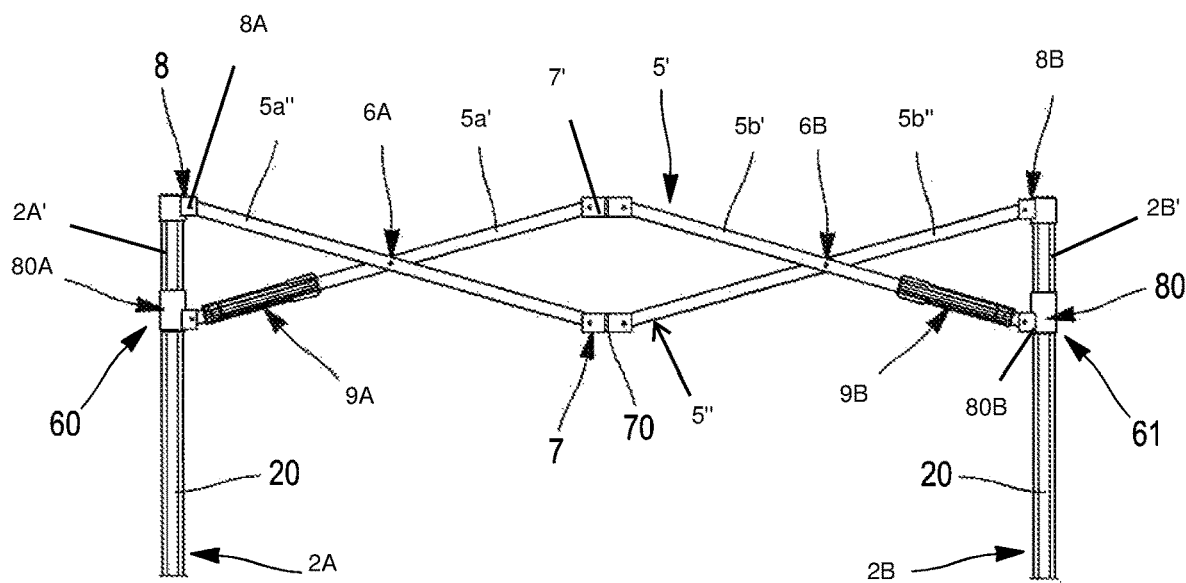
FIG. 2 schematically shows a side elevation view illustrating a stringer of the skeleton of the structure, with the adjustable arms in an intermediate length for folding of said structure.

The articulations 6 and 7, as well as the points 8 and 80, are particularly visible in FIG. 2.

Furthermore, transversely and as indicated above, the skeleton 3 may comprise a crosspiece 50 connected to the second upright 2B' and extending to a third upright 2C as in FIG. 1. There are crosspieces 50 also provided to be movable and made up of one or several pairs of arms 5c, 5d articulated in a scissor similar to those of the stringers 5.

The mobility of the stringers 5 may also be obtained with these crosspieces 50 at the articulation points 800. More particularly at such an articulation point 800, one end of one of the arms 5c, 5d of a pair corresponding to a cross-piece 50 cooperates, in an articulated manner, in a direction substantially perpendicular and transverse to an appropriate junction part or a third upright 2C, in particular in the form of a journal cross, with one end of one of the arms, depending on the case 5a, 5b, of a pair of arms of a stringer 5, forming a crossed mesh. This configuration is visible in FIG. 1.

According to one essential feature of the present invention, the structure 1 makes it possible to obtain an incline of the cover element 4. Furthermore, the degree of the obtained slope may be adjusted, in particular according to predefined angles.

To that end, at least one of the arms 5a, 5b of a pair of arms of a stringer 5 is provided to be longitudinally adjustable through means 9 for lengthening and shortening its length. In other words, one arm of a stringer 5 can be lengthened or shortened, causing a change in the shape of the structure 1, imparting an asymmetry relative to the transverse vertical median plane.

Preferably, according to the preferred embodiment, as shown in FIG. 2, at least one arm 5a' is longitudinally adjustable at a first end of a stringer 5' and at least one arm 5b', which depending on the case may or may not belong to the same pair, at the opposite end of this stringer 5' is also longitudinally adjustable. This adjustment to the length of the adjustable arms 5a', 5b' may be obtained through appropriate lengthening and shortening means 9 as 9A and 9B, respectively.

In one particular embodiment, at least each stringer 5 located at the lateral ends of the structure 1 comprises arms 5a, 5b provided with lengthening and shortening means 9.

Figure 7:
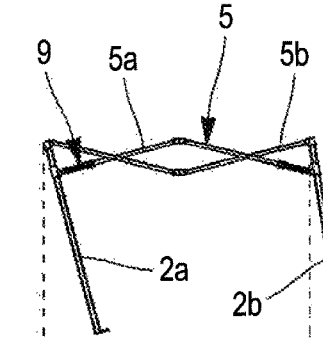

Then, as shown in the example of FIG. 7, the lengthening of the arms 5b at the end 61 of the stringers 5 causes an incline of the uprights 2b on the side of this same end 61. At the same time, a shortening of the arms 5a on the side of the first end 60 of these stringers 5 causes an incline of the uprights 2a in the same direction. In order to straighten the uprights 2a and 2b, it is essentially necessary to lengthen the uprights 2a located on the left of the structure 1. The slope of the cover element 4 results therefrom.

Figure 8:
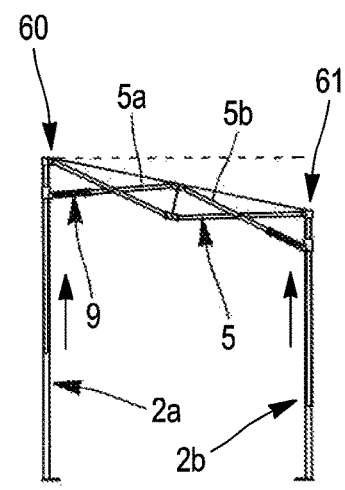

It may also be desirable, once the uprights 2a, 2b are vertically repositioned, to raise the structure 1. This may be obtained by increasing the height of all of the uprights 2a, 2b, as shown in FIG. 8.

To that end, each upright 2 may advantageously be provided to be deployable. According to this preferred embodiment, each upright 2 may be provided to be telescoping. In particular, an upright 2 comprises at least two segments 20, inner and outer, sliding relative to one another to go from a retracted position during folding of the structure 1 to a deployed position during the deployment of said structure 1, and vice versa.

Furthermore, each arm 5a, 5b of a stringer 5 equipped with means 9 is preferably located on either side, at the ends of the skeleton 3, along longitudinal edges of the structure 1. The means 9 then connect the arms, depending on the case 5a or 5b, to the uprights 2 at lower pivot points 80, as well as at articulation points 800 of the arms 5c, 5d of the crosspieces 50 of the journal cross framework.

Figure 3:
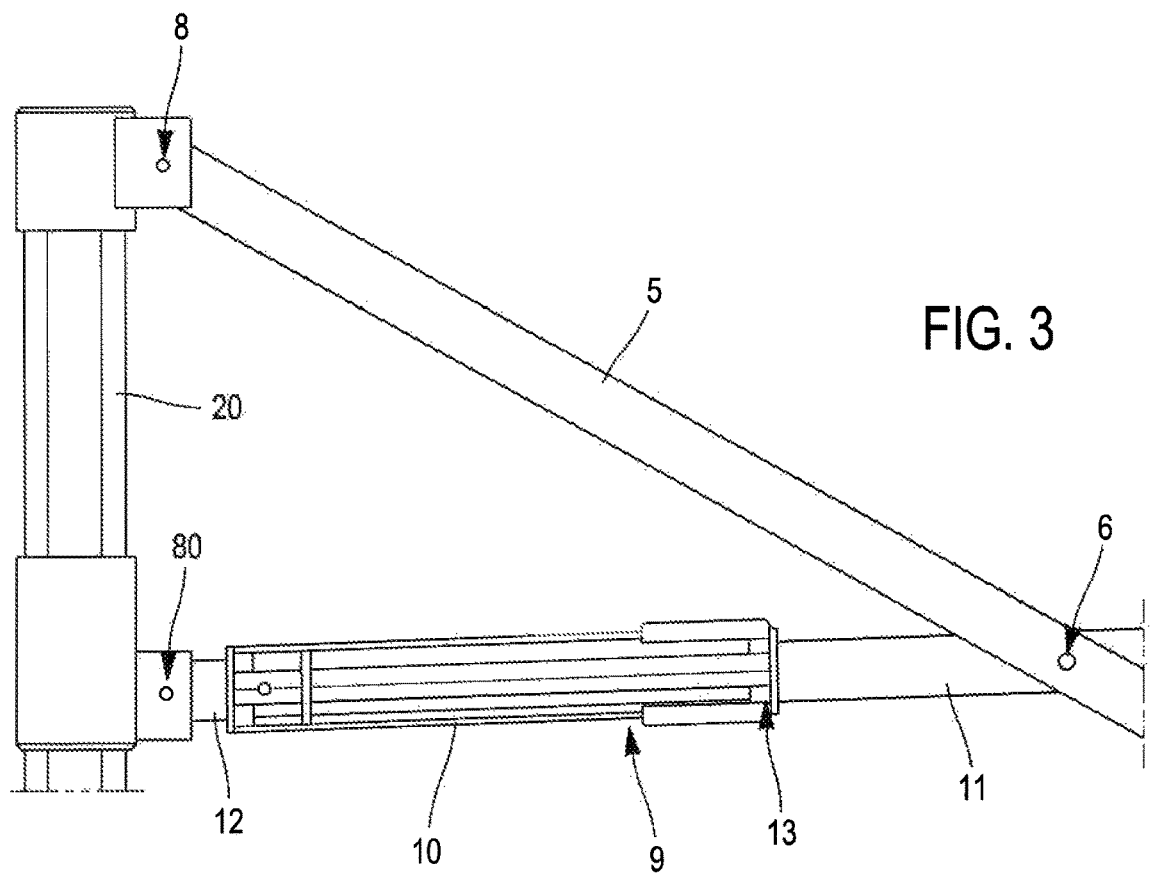
FIG. 3 schematically shows, partially and transparently, a detailed elevation view of one of the adjustable arms of FIG. 2, in the shortened position.
Figure 4:
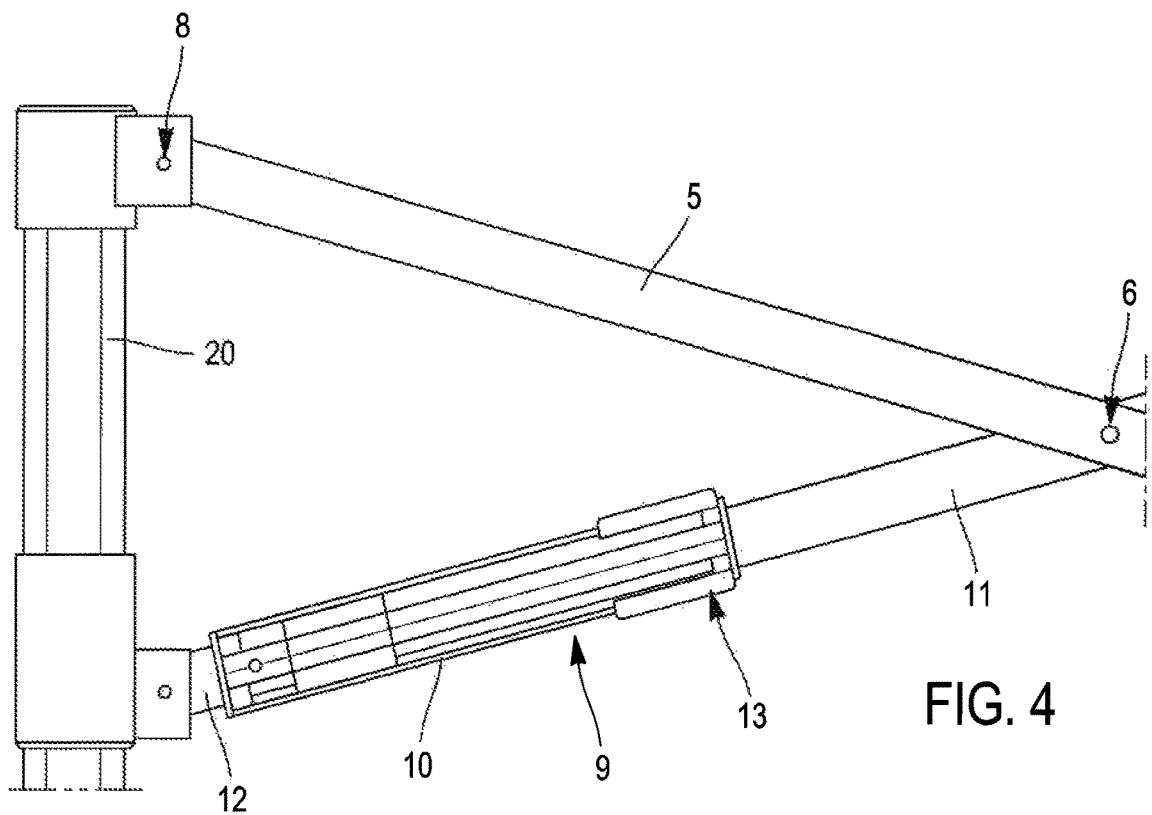
FIG. 4 schematically shows a detailed elevation view similar to FIG. 3, transparently showing an intermediate lengthened position of an adjustable arm.
Figure 5:
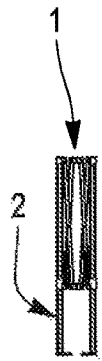
FIGS. 5, 6, 7 and 8 schematically show side elevation views of a structure device according to the invention during four successive steps, reciprocally in the folded position of said structure for storage and transport thereof, in the deployed position in which the roof is straight, in a first lengthening position of the adjustable arms causing the incline of the uprights, and lastly in an upright position by adjusting the length of said uprights to impart the slope to said roof.
Figure 6:
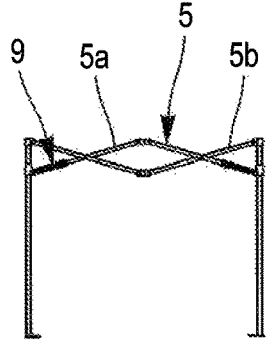

As shown in FIGS. 3 and 4, the means 9 make it possible to increase or decrease the length at the end equipped with the adjustable arms 5a, 5b.

More particularly, according to the preferred embodiment, said lengthening and shortening means 9 are telescoping, through sliding segments making up each adjustable arm 5a, 5b.

Further, non-limitingly, the means for lengthening and shortening 9 each adjustable arm 5a, 5b comprise telescoping components, 10, 11, at a distal end 12, a sheath 10, on the one hand, mounted outwardly sliding relative to a main segment 11 of said adjustable arm 5a, 5b and, on the other hand, secured to a pivot point 80 or an articulation point 800.

More specifically, this sheath 10 is secured at one of its ends to the pivot point 80 (or to an articulation point 800).

Thus, as shown in FIG. 4, it is possible to translate the main segment 11 to move it away from or, depending on the case, closer to the distal end 12, creating a space with a given length corresponding to the desired lengthening or shortening of the adjustable arm 5a, 5b.

According to one preferred embodiment, said lengthening and shortening means 9 comprise indexing means 13 for the length of each adjustable arm 5a, 5b at, preferably but not exclusively, extreme lengthened and shortened positions, or even advantageously also in intermediate positions. Thus, it is possible to adjust and block the length of each arm 5a, 5b, therefore of a stringer 5.

However, not all of the means 9 may be equipped with indexing. In particular, only the means 9 secured to the uprights 2 have indexing means 13, while the others, connected to the transverse framework provided with journal cross cross-pieces 50, do not necessarily have them, optionally being able to slide freely. Then, only the means 9 connected to the uprights 2 are used for indexing and locking.

Figure 9:
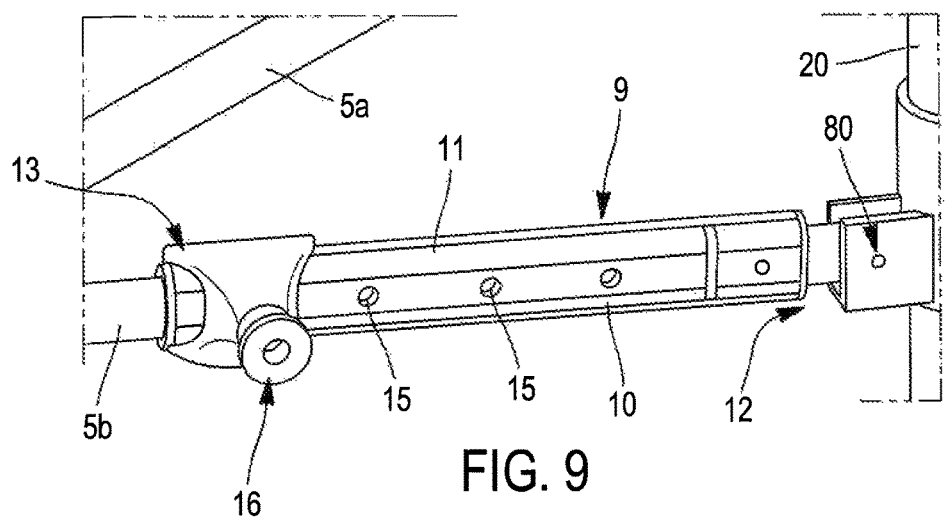
FIG. 9 schematically shows a perspective and transparent view of one particular embodiment of the means for lengthening and shortening an adjustable arms.
Figure 10:
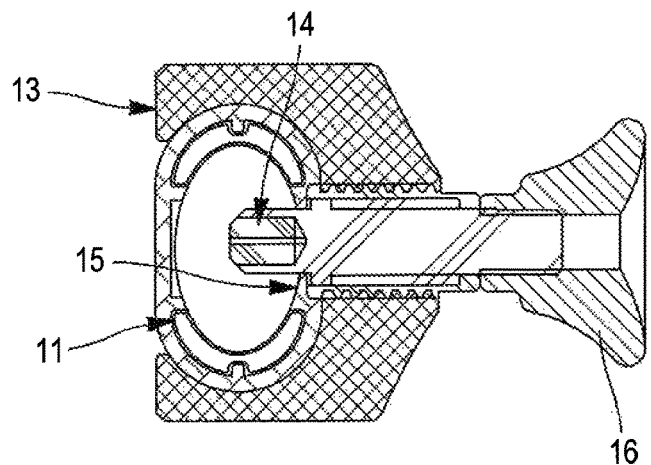
FIG. 10 schematically shows a cross-sectional view of the indexing means of FIG. 9.

According to still another preferred embodiment, as shown in FIGS. 9 and 10, said indexing means 13 are mounted fixed at the opposite end of said sheath 10, in particular via a part secured around the sheath 10. They comprise a lug 14 cooperating by insertion through orifices 15 arranged across from one another and along said main segment 11. This lug 14 is mounted in translation within a housing configured in a complementary manner.

The lug 14 may also be equipped with resilient return means, pushing it in a translational movement toward an insertion and locking position. Thus, it suffices to pull the lug 14, via appropriate gripping means 16, then to slide the main segment of the adjustable arm 5a, 5b relative to the sheath 10 until an orifice 15 is located across from said lug 14 and the latter is pushed back automatically to be engaged there. Each orifice 15 then makes it possible to adjust a position and a particular incline of the slope of the device 1.

The orifices 15 may or may not be spaced apart at regular intervals.

It will be understood that these indexing means 13 may assume various forms intended to immobilize, in a given position, the length of an adjustable arm 5a, 5b, such as a pin, leaf spring with ball, screw-nut system, etc.

Furthermore, the movement of the segments 20 of each upright 2 can also be indexed, making it possible to block them vertically in several positions, preferably a low position where the segments 20 are completely retracted, an extreme maximum deployment position in which the framework is raised, as well as an intermediate position in which the framework is horizontal. The indexing of the positions along the uprights 2 may advantageously correspond to the indexing of the means 9 at the orifices 15.

Preferably, the angle of the slope may be indexed according to determined angular values, going from 1 to 45 degrees, preferably at least 5 degrees, by intervals from 1 to 5 degrees.

Thus, the structure device 1 according to the invention makes it possible to quickly and easily impart a slope to a shelter, from a skeleton 3 configured in pantographs, as well as journal crosses, through the lengthening and shortening of some of the adjustable arms 5a, 5b of its stringers 5, while retaining the geometry necessary for optimal folding of such a structure 1.

In other words, the variable length of at least one stringer 5, preferably several, allows the deformation of the parallelograms of the skeleton 3, imparting to the latter, depending on the case, a regularity necessary for folding of said structure 1 or, on the contrary, after deployment, an irregularity making it possible to impart the desired incline to the roof. The incline, for example relative to the horizontal, of the roof, along a direction of said structure 1, preferably the longitudinal direction, results from this incline and the telescoping nature of the upright(s) 2.

Likewise, the invention may be adapted at the crosspieces and the transverse journal cross mesh, in order to impart an incline in the transverse direction of the structure 1.

I claim:

1. A deployable shelter structure device, comprising:
a deformable skeleton being comprised of a plurality of moving stringers; and
a plurality of uprights supporting said deformable skeleton, said uprights being comprised of a first upright with a first upper part and a second upright with a second upper part,
wherein each moving stringer comprises a first pair of articulated scissor arms, and a second pair of articulated scissor arms,
wherein said first pair of articulated scissor arms is comprised of a first primary arm and a first secondary arm,
wherein said second pair of articulated scissor arms is comprised of a second primary arm, and a second secondary arm, said second primary arm having a first set length, said second secondary arm having a second set length,
wherein said first primary arm is connected to said first upper part of said first upright at a first primary upper pivot point and to said first secondary arm at a first pivoting articulation,
wherein said first secondary arm is connected to said second upper part of said second upright at a second primary upper pivot point and to said first primary arm at said first pivoting articulation,
wherein said second primary arm is connected to said first upper part of said first upright at a first secondary upper pivot point and to said second secondary arm at a second pivoting articulation,
wherein said second secondary arm is connected to said second upper part of said second upright at a second secondary upper pivot point and to said second primary arm at said second pivoting articulation,
wherein said first primary arm is pivotally connected to said second primary arm at a first middle pivot point between said first primary upper pivot point and said first pivoting articulation,
wherein said first secondary arm is pivotally connected to said second secondary arm at a second middle pivot point between said second primary upper pivot point and said first pivoting articulation,
wherein said first secondary upper pivot point is placed above said first primary upper pivot point,
wherein said second secondary upper pivot point is placed above said second primary upper pivot point, and
wherein said first primary arm is comprised of a first means for lengthening and shortening being made integral with said first primary arm between said first middle pivot point and said first primary upper pivot point.

2. The structure device according to claim 1, wherein said first secondary arm is comprised of a second means for lengthening and shortening being made integral with said first secondary arm between said second middle pivot point and said second primary upper pivot point.

3. The structure device according to claim 1, wherein said first means for lengthening and shortening is comprised of telescoping components in a sliding relationship with each other.

4. The structure device according to claim 3, wherein said first means for lengthening and shortening are comprised of an indexing means.

5. The structure device according to claim 3, wherein said telescoping components are comprised of a main segment formed by said first primary arm, and a sheath slidably mounted on said main segment.

6. The structure device, according to claim 5, wherein said sheath is secured to said first primary upper pivot point.

7. The structure device according to claim 6,
wherein said first means for lengthening and shortening are comprised of an indexing means,
wherein said indexing means are comprised of a lug slidably mounted along said sheath, and a plurality of orifices through said sheath and said main segment, said orifices being arranged between a respective upright and a corresponding first pivoting articulation or second pivoting articulation, said lug being removably insertable through each orifice.

8. The structure device according to claim 1, wherein said first upright is telescoping.

9. The structure device according to claim 1, wherein said first upright and said second upright are telescoping.

10. The structure device according to claim 1, wherein said deformable skeleton is further comprised of a crosspiece connected to said second upright and extending toward a third upright.

\* \* \* \* \*